United States Patent [19]
Constable

[11] Patent Number: 6,038,408
[45] Date of Patent: Mar. 14, 2000

[54] OPTICAL DATA RECORDING CIRCUIT FOR A FILM CAMERA

[75] Inventor: Douglas W. Constable, Rochester, N.Y.

[73] Assignee: Eastman Kodak Company, Rochester, N.Y.

[21] Appl. No.: 09/251,028

[22] Filed: Feb. 18, 1999

[51] Int. Cl.[7] .................................................. G03B 17/26
[52] U.S. Cl. .............................. 396/317; 396/6; 396/206
[58] Field of Search .............................. 396/6, 205, 206, 396/317

[56] References Cited

U.S. PATENT DOCUMENTS

| | | |
|---|---|---|
| 3,889,281 | 6/1975 | Taguchi et al. . |
| 4,151,446 | 4/1979 | Ludloff . |
| 4,290,692 | 9/1981 | Svatek . |
| 4,912,499 | 3/1990 | Desormeaux . |
| 5,574,337 | 11/1996 | Dunsmore ..................................... 396/6 |
| 5,619,737 | 4/1997 | Horning et al. . |
| 5,669,023 | 9/1997 | Iida . |
| 5,739,850 | 4/1998 | Hori . |
| 5,752,084 | 5/1998 | Motomura et al. ......................... 396/6 |
| 5,781,804 | 7/1998 | Constable . |
| 5,875,357 | 2/1999 | Motomura et al. ......................... 396/6 |

*Primary Examiner*—Russell Adams
*Attorney, Agent, or Firm*—Francis H. Boos, Jr.

[57] ABSTRACT

An optical data recording circuit includes an optical recording device normally illuminated from a camera battery means in conjunction with initiation of flash illumination in the camera flash illumination circuit. The data recording circuit includes a first charging circuit path having a charging diode and an auxiliary charge storage capacitor for maintaining a charge voltage substantially equal to battery no-load voltage. The optical recording device, typically an LED, is connected to the charge voltage point of the first circuit and, through a switch device to a return terminal of the battery. When the switch device is closed in conjunction with initiating flash illumination, the LED is illuminated by the battery through the charging diode of the first circuit path. If, however, load on the battery from another circuit, such as the flash charging circuit, causes battery voltage to drop below a level needed to effect illumination of the recording device, the auxiliary storage capacitor charge voltage operates to effect illumination of the recording device.

9 Claims, 4 Drawing Sheets

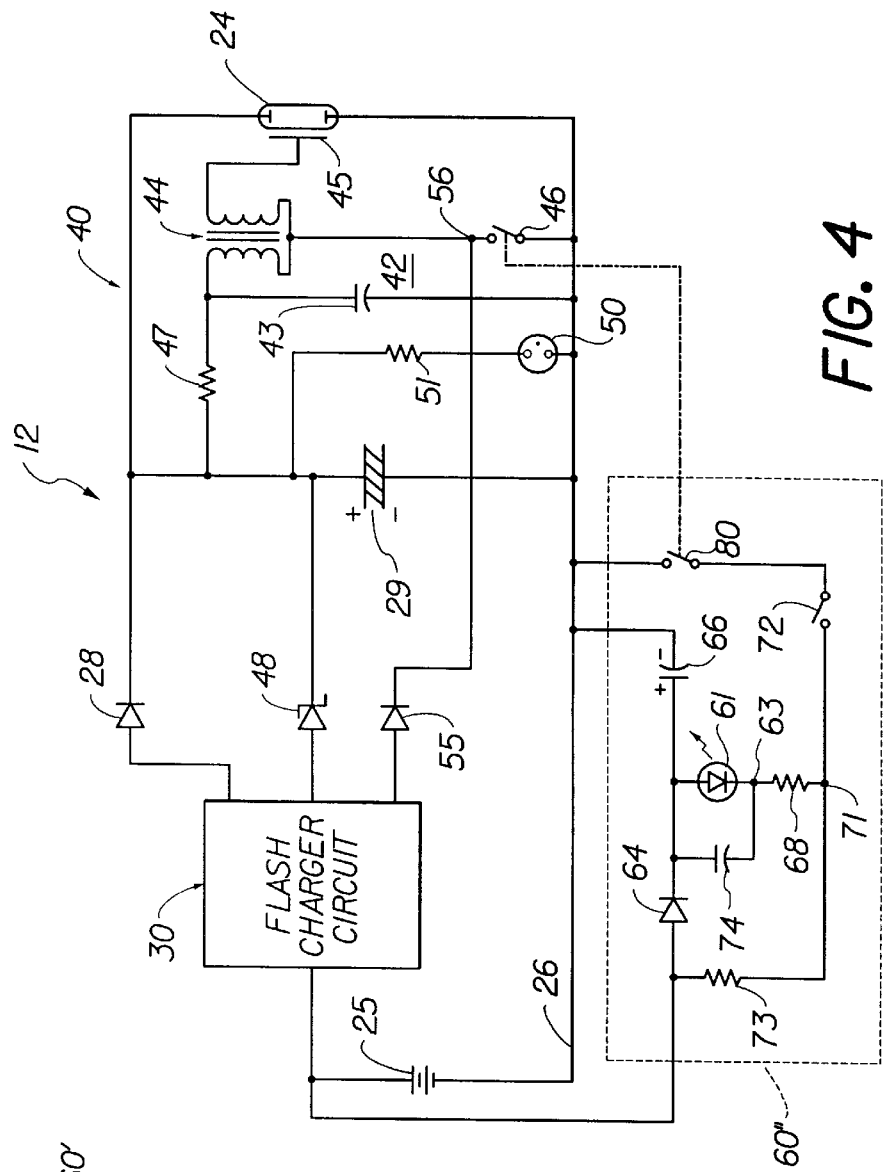
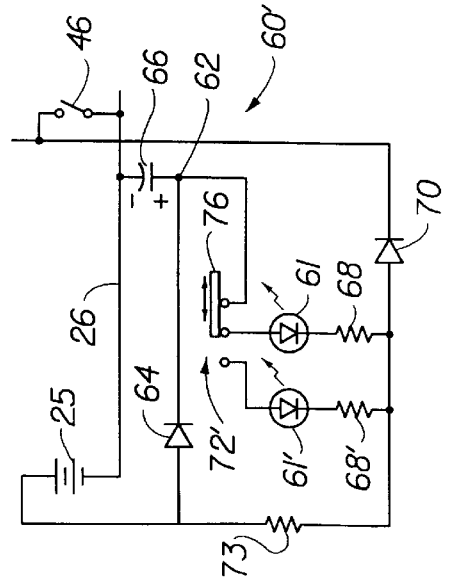
FIG. 4
FIG. 3

OPTICAL DATA RECORDING CIRCUIT FOR A FILM CAMERA

FIELD OF THE INVENTION

The invention relates generally to the field of photography, and in particular to a circuit for optical recording of data on film in a camera.

BACKGROUND OF THE INVENTION

One-time-use cameras with film pre-loaded by the camera manufacturer and typically including a flash illumination feature are very popular with consumers. It is very important for the continued commercial success of these cameras that they provide good quality, reliable operation at the lowest possible product cost. One-time-use cameras are currently available that utilize Advance Photo System (APS) film and have provision for providing a selection of ski desired print aspect ratios. APS specifications include provision for optically recording (or not recording) blips in the film margin adjacent each image frame that signal the photofinisher which print aspect ratio to apply. These blips are colloquially referred to as "fat bits". In the specification, there are three available print aspect ratios, H, P and C, which roughly correspond to HDTV, panoramic and conventional 35 mm aspect ratios, respectively. No recorded fat bit specifies the H aspect ratio, a single recorded fat bit specifies the P aspect ratio and two recorded fat bits specify the C aspect ratio.

In commonly assigned, co-pending U.S. application Ser. No. 09/149,688, there is shown a flash circuit for a one-time-use camera in combination with a data bit recording circuit for recording fat bits on the film. The data recording circuit employs a light emitting diode (LED) which is powered from the main flash capacitor of the flash circuit. The flash circuit is designed to maintain a minimum voltage on the flash capacitor substantially equal to the battery supply voltage to insure that there is sufficient voltage to illuminate the LED even if the flash capacitor is fully self-discharged following a long period of non-use of the camera. While effective for its purpose, this arrangement requires that the data recording circuit include a relatively costly high-voltage-rated transistor and a zener diode for protecting the LED from the high voltage of the flash capacitor when fully charged and for limiting the LED current to the relatively low level of 5 to 10 milliamps needed for illumination of the LED. There is therefore a need for a data recording circuit which will operate reliably to optically record data on the film, such as fat bits, that is simple in design and does not require costly circuit components for protection of the LED.

SUMMARY OF THE INVENTION

Therefore, in accordance with the invention, there is provided an optical data recording circuit of the type having an optical recording device, with first and second terminals, for exposing data marks on film in a camera, the camera including a flash charging circuit, a flash illumination circuit having a main flash capacitor, and battery means having first and second terminals operatively coupled to the flash charging circuit. According to the invention, the data recording circuit is characterized by a first circuit path including a charging diode and an auxiliary storage capacitor coupled between the first and second terminals of the battery means to charge the auxiliary storage capacitor to a no-load output voltage of the battery means, the first terminal of the optical recording device being coupled to the auxiliary storage capacitor. The data recording circuit is further characterized by a second circuit path including a blocking diode and a switch device adapted for closure in conjunction with initiation of a flash illumination, wherein the second circuit path is coupled from the second terminal of the optical recording device to one of the battery means terminals and is effective upon closure of the switch device for coupling the second terminal of the recording device to a terminal of the battery means. In accordance with this arrangement, charge voltage on the auxiliary capacitor is normally maintained at a level substantially corresponding to the no-load output voltage of the battery means and, when the switch device is closed upon initiation of flash illumination, if an operating load on the battery means renders output voltage of the battery means insufficient to effect illumination of the optical recording device through the charging diode, then the auxiliary capacitor charge voltage effects illumination of the optical recording device.

BRIEF DESCRIPTION OF THE DRAWINGS

In the drawings:

FIG. 3 is a modification of the of the data recording circuit of FIG. 2 allowing for selection of plural data recording encodements;

FIG. 4 is a second embodiment of the data recording circuit of the invention illustrating an alternative triggering mechanism for initiating the data recording function.

DETAILED DESCRIPTION OF THE INVENTION

Figure 1:
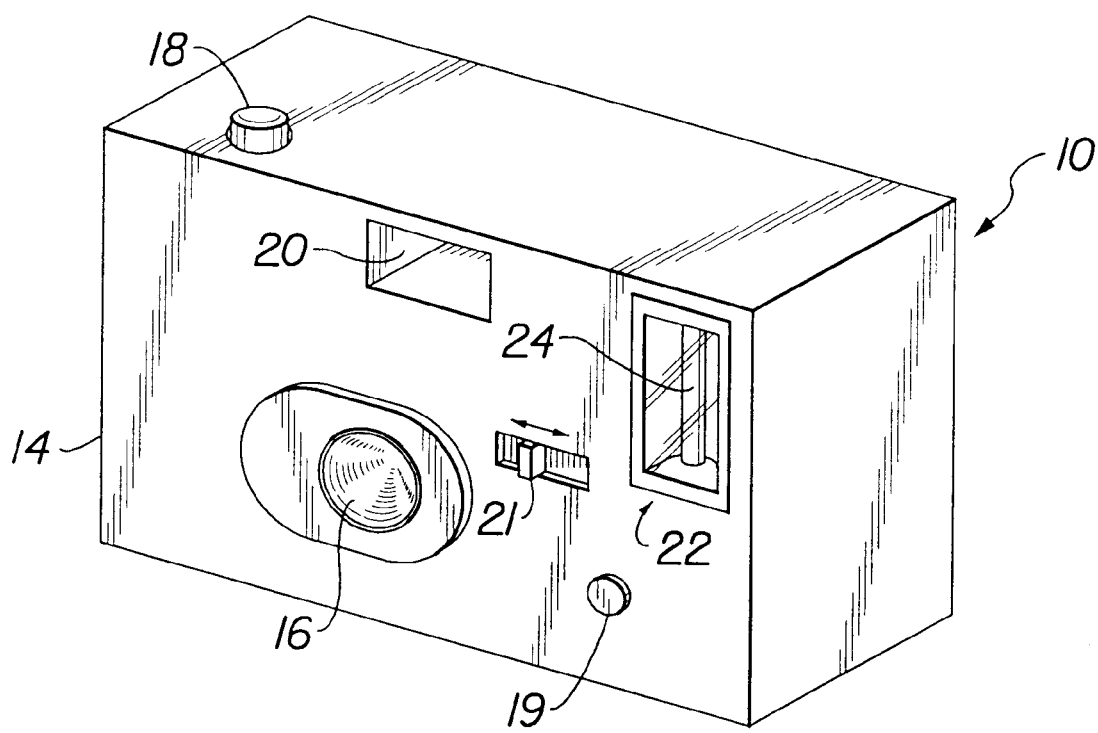
FIG. 1 is a diagrammatic illustration of a single use camera in which the present invention is particularly useful.

Referring to FIG. 1, there is depicted a low cost, single use camera 10 including a body 14, an optical taking lens system 16, a viewfinder 20 and a flash device 22 including a flash tube 24. A shutter button 18 initiates a picture taking sequence which opens and closes a shutter (not shown) to expose the film through optical system 16. Opening of the shutter also actuates an internal flash sync switch to a closed position, thereby initiating supplemental scene illumination from flash tube 24. A "one-touch" button 19, operable by the camera user, initiates a flash charging cycle to charge a flash capacitor to provide energy for operation of the flash tube 24. The camera is pointed at the intended subject with the aid of viewfinder 20. A switch 21 is provided for selection by the camera user of image frame aspect ratio data to be recorded on the film as will be described in more detail below.

Figure 2:
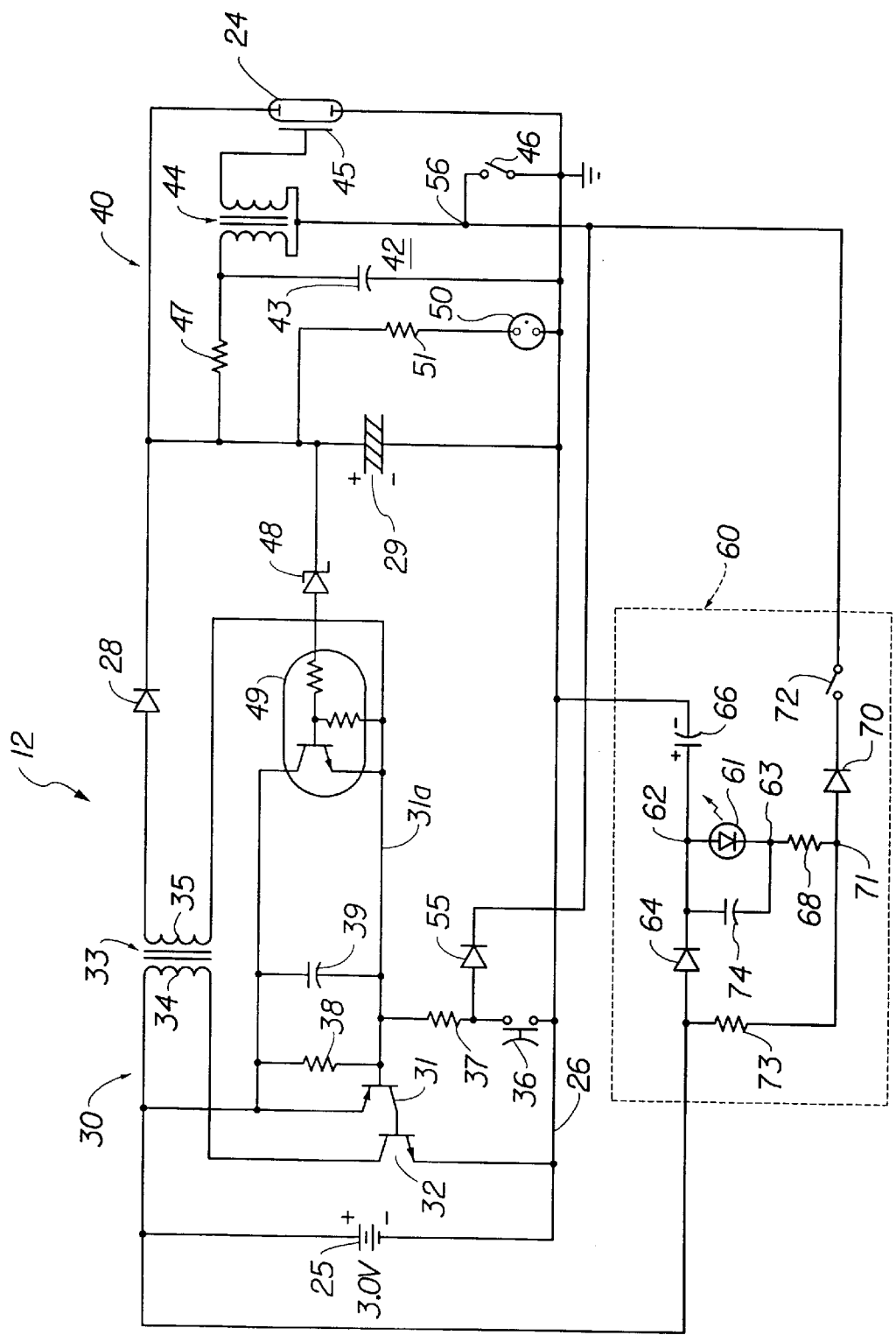
FIG. 2 is a circuit diagram of an embodiment of the data recording circuit of the invention adapted for use with a common ground flash charger and flash illumination circuit.

Turning now to FIG. 2, there is shown a circuit arrangement for the camera 10 comprising an auto-restart flash circuit 12 and an optical data recording circuit 60. As shown therein, flash circuit 12 includes a self-oscillating flash charging circuit 30 and a flash illumination circuit 40. Flash charging circuit 30 comprises first and second oscillating transistors 31, 32, a step-up oscillation transformer 33 having primary winding 34 and secondary winding 35, and a rectifier diode 28. A manually operated, normally open, momentary switch 36 is closable by depression of "one-touch" button 19 on camera 10. One terminal of switch 26 is connected via common ground line 26 to the negative terminal of power supply battery 25. The other terminal of switch 36 is coupled via current limiting resistor 37 to the base of first oscillation transistor 31. When momentary switch 36 is closed, a negative bias potential is applied to the base of PNP transistor 31 turning on both transistors 31 and 32 to initiate oscillatory pulses through primary winding 34. These pulses are stepped up in the secondary winding 35 and rectified by diode 28 to charge main flash capacitor 29 in the flash illumination circuit 40. Feedback current from the secondary winding 35 via line 31a to the base of transistor 31 sustains the oscillatory condition, even when the "one-touch" button 19 is released to open switch 36 thereby removing the negative bias potential on the base of transistor 31. Resistor 38 is connected across the base-emitter junction of transistor 31 and serves to hold the DC potential on the base of transistor 31 at the potential of the positive terminal of battery 25 when the oscillation circuit is off. Any static electricity induced current that would otherwise flow through the junctions of transistors 31 and 32 is bypassed to the battery 25 positive terminal and does not inadvertently start the charging circuit. The value of resistor 38 relative to that of resistor 37 is chosen to ensure that the base-emitter junctions of transistors 31 and 32 are forward biased when switch 36 is closed. Resistor 38 also provides a DC circuit path from the positive output terminal of battery 25 via line 26, secondary winding 35 and diode 28 to the positive terminal of main flash capacitor 29. The negative terminal of flash capacitor 29 is returned to the negative return terminal of battery 25 ensuring that, even after long term self-discharge of the flash capacitor, a minimum charge voltage will remain on the capacitor equal to the 3 volt no-load battery voltage minus the small junction drop of diode 28. Capacitor 39 protects transistor 31 from positive-going oscillation spikes.

Flash illumination circuit 40 includes main flash capacitor 29, flash tube 24 and a flash trigger circuit 42, the latter comprising trigger capacitor 43, isolation resistor 47, voltage converting transformer 44, flash triggering electrode 45 and a flash trigger switch 46. In the illustrated embodiment, trigger switch comprises a shutter/flash sync switch which is closed when the camera shutter is opened by depression of camera shutter button 18. Trigger capacitor 43 is charged by current flow through charging transformer secondary winding 35 at the same time and in similar manner as flash capacitor 29. When switch 46 is closed during a picture-taking sequence, switch terminal 56, which is at the positive charge potential of flash capacitor 29, is momentarily grounded to the negative terminal of battery 25. Trigger capacitor 43 then discharges through the primary winding of voltage converting transformer 44, inducing a high voltage pulse of about 4.0 kilovolts in the secondary winding which is applied to triggering electrode 45. This causes ionization of the gas in flash discharge tube 24 resulting in main flash capacitor 29 discharging through the flash tube 24, exciting the gas and producing flash illumination.

Neon light 50 and current limiting resistor 51 connected in series across flash capacitor 29 comprise a ready light circuit to advise the camera user when sufficient charge is stored in capacitor 29, e.g. +270 volts, to sustain a flash illumination from flash tube 24. The flash circuit 40 also includes an oscillation arresting circuit comprising 320 volt zener diode 48 and an NPN switching transistor 49. When the flash capacitor charge voltage reaches full charge of +320 volts, zener diode 48 breaks down and momentarily conducts, applying a positive bias on the base of transistor 49. This drives transistor 49 into conduction shunting the base of oscillation transistor 31 to the positive terminal of battery 25 thereby turning off transistors 31, 32 and stopping oscillation in the charging circuit 30. To automatically restart the oscillations in flash charging circuit 30 after taking a picture, a diode 55 has its anode connected via resistor 37 to the base of transistor 31 and its cathode connected to terminal 56 on the normally open contact side of trigger switch 46. In the illustrated circuit, except when switch 46 is closed, there is always a positive potential at terminal 56 equal to or greater than the battery output voltage minus the forward bias voltage drop across the junction of diode 28. As a consequence, diode 55 is normally in a reverse biased, "open", state. When trigger switch 46 is closed to initiate a flash picture, the cathode of diode 55 is connected momentarily to ground line 26 to forward bias the diode and draw current through the base-emitter junction of transistor 31, thereby restarting oscillations in the flash charging circuit 30.

In the Advanced Photo System, there is provision for recording optical data bits on the film to indicate the format of the resultant photoprint that the camera user wants. For this purpose, the circuit of FIG. 2 includes an optical data recording circuit 60 which comprises an optical data recording device, such as a light emitting diode (LED) 61 having first and second terminals 62, 63 which, in the circuit of FIG. 2, comprise anode and cathode terminals, respectively, of the LED 61. The illustrated data recording circuit 60 includes a first circuit path having a charging diode 64 and an auxiliary storage capacitor 66 coupled between said first and second terminals of the battery 25 to charge said auxiliary storage capacitor to a no-load output voltage of said battery 25. The anode terminal 62 of LED 61 is coupled to the auxiliary storage capacitor 62. A second circuit path comprising a current limiting resistor 68, blocking diode 70 and a data bit selector switch 72 is coupled from cathode terminal 63 of the LED 61 to normally open terminal 56 of flash trigger switch 46. A high valued resistor 73, e.g. 2.0 megohms is connected from the positive terminal of battery 25 to terminal 71 of the second circuit path to maintain terminal 71 stable at the battery output voltage level of 3.0 volts. A bypass capacitor 74 prevents any noise voltage appearing in the first circuit path while the charger circuit is running from inadvertently causing illumination of LED 61.

In operation, momentary closure of "one touch" switch 36 initiates oscillation in the charger circuit 30 creating high voltage output pulses in the secondary winding 35 of transformer 33. The pulses are rectified by diode 28 and charge main flash capacitor 29 to a positive voltage approximately 330 volts. Upon reaching 330 volts device 48 (zener diode or varistor) begins conduction, turning on transistor 49, and thereby stopping oscillation in the charger circuit 30. Upon closing trigger switch 46, trigger capacitor 43 discharges through the primary of transformer 44 creating a stepped-up voltage in the secondary of transformer 44 which is applied to the trigger electrode 45 of flash tube 24 ionizing the gas in flash tube 24. Flash capacitor 29 then discharges through tube 24 initiating flash illumination. Closure of switch 46 also pulls the cathode of diode 55 to ground which restarts oscillation in the flash charger circuit.

Assuming that data bit selector switch 72 is open, which would be the case if the camera user had selected an H print aspect ratio, closure of switch 46 has no effect on the data bit recording circuit 60 and, consequently, no fat bit is recorded on the film. On the other hand, if the camera user has closed data bit selector switch 72, indicating a desire to have a fat bit recorded to indicate a P print aspect ratio, blocking diode 70 is reverse biased by the positive potential on flash capacitor 29 which also appears at terminal 56. The purpose of blocking diode 70 is to isolate LED 61 and the remainder of recording circuit 60 from the high voltage levels on main flash capacitor 29. Auxiliary capacitor 66 is assumed to have been previously charged through charging diode 64 to the potential of battery 25 (actually the battery 25 potential less the small drop across the junction of diode 64). Since terminal 71 is held also at the potential of battery 25 via the resistor 73, LED 61 is not illuminated. However, when trigger switch 46 is momentarily closed to initiate flash illumination as described above, terminal 71 is pulled to a voltage of one diode (70) drop above ground potential on line 26 thereby applying nearly full battery potential across LED 61. Assuming absence of a load on the battery 25, LED 61 would be illuminated by the no-load voltage (3 volts) of battery 25 applied through diode 64. However, closure of trigger switch 46 also restarts the flash charger circuit via diode 55 as described above. The charger circuit load on battery 25 causes the output voltage of the battery to drop significantly, typically to 1.5 volts. LED 61 typically requires a current of 5–10 milliamps to be illuminated. This current establishes about a 1.5 volt drop across the LED. Current limiting resistor 68 determines the current. Consequently, voltage applied to the LED greater than 1.5 volts is required for the LED to be illuminated. As a result, the 1.5 volt battery voltage during operation of the flash charger is insufficient to effect illumination of the LED. However, the charge voltage on auxiliary storage capacitor 66 is at the full, 3 volt no-load voltage of battery 25 (less the small diode drop of the 64) and, as a consequence, there is sufficient voltage from the positive terminal of auxiliary storage capacitor 66 to effect illumination of the LED for sufficient time to impress a data bit recording on the film.

In FIG. 3, an alternative embodiment of the data bit recording circuit is illustrated wherein an additional LED 61' and current limiting resistor 68' are included in the data recording circuit 60'. A modified data selector switch 72' includes a three position switch actuated by user movement of slide switch 21 on the camera to select illumination of both LEDs, one LED or no LED illumination. In all other respects the circuit of FIG. 3 is the same as that shown in FIG. 2.

Turning now to FIG. 4, a flash circuit 12 is shown which is the same is that of FIG. 2. The data recording circuit 60", however, is modified to the extent of the use of a separate switch device 80 connecting the second circuit path directly to the common line 26. This arrangement eliminates the need for high voltage blocking diode 70. In all other respects, data recording circuit 60" is the same as shown in FIG. 2 and like components carry the same reference numerals. Switch 80 is ganged with flash trigger switch 46 so that switch 80 closed in conjunction with initiation of flash illumination in flash illumination circuit 40. When closed, switch 80 causes illumination of LED 61 in the same manner as described above. It will be appreciated that other arrangements for closing the switch device to initiate illumination of LED 61 in conjunction with initiating flash illumination without necessarily tying the switch device mechanically to the flash trigger switch 46.

Figure 5:
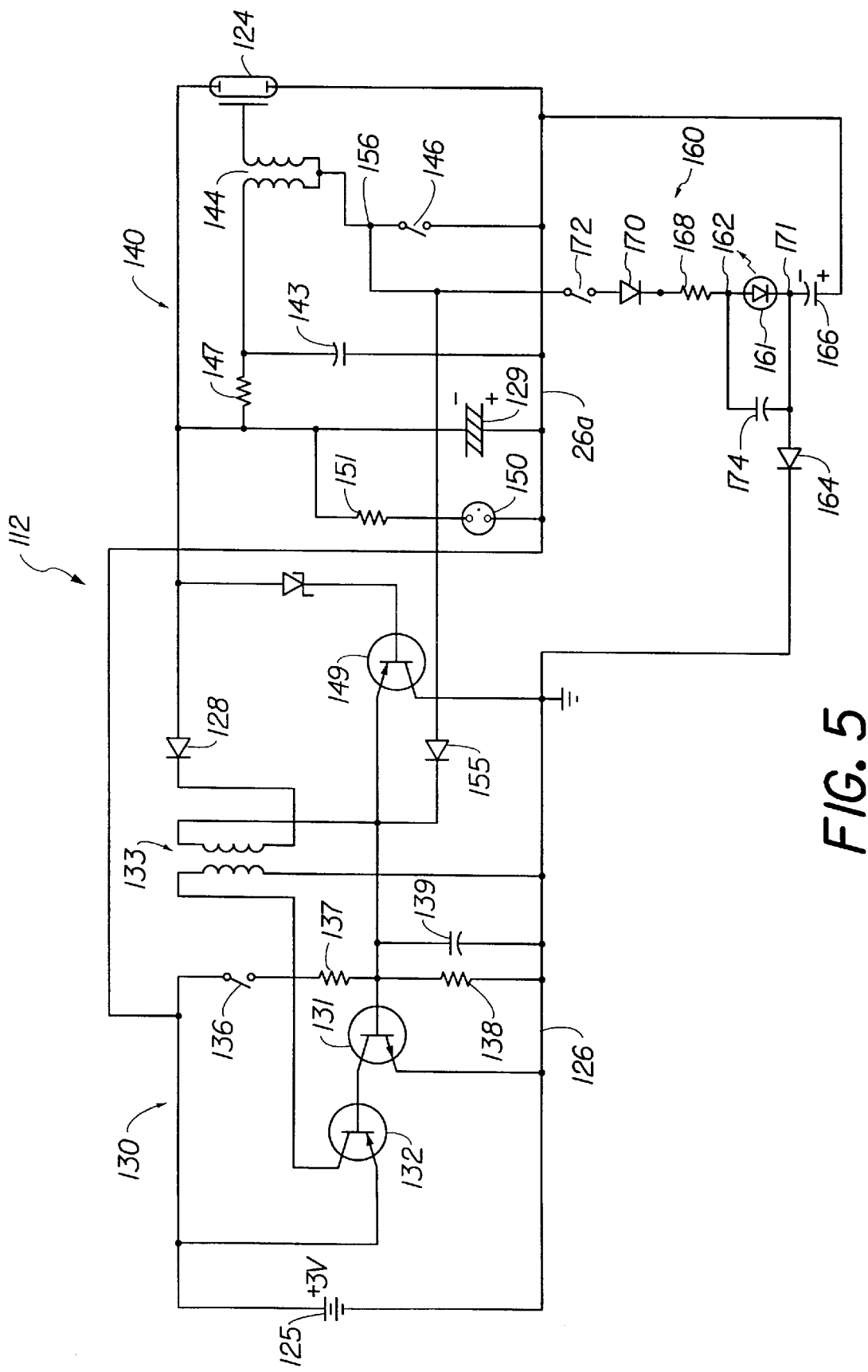
FIG. 5 is a third embodiment of the data recording circuit of the invention adapted for use with a separate common return line type of flash charger and flash illumination circuit.

In FIG. 5, flash circuit 120 is shown which is similar to the flash circuit 12 of FIG. 2 with functionally similar components bearing the same reference numeral preceded by the numeral "1". The differences in the flash circuit 120 are that the polarities of rectifier diode 128 and other components are reversed appropriately in known manner to charge main flash capacitor 129 negatively. Additionally, separate return lines for the flash charger circuit 130 and flash illumination circuit 140 in which a ground line 126 for flash charger circuit 130 is connected to the negative terminal of battery 125 while a separate common return line 26a for flash illumination circuit 140 is connected to the positive terminal of battery 125. Flash circuits of this type are known in the art. Flash circuit 120 is shown here to illustrate how a data recording circuit 160 in accordance with the invention may be modified to work with split common line flash circuits. To this end, in data recording circuit 160, the first circuit is connected between the ground line 126 and the positive common return line 126a with the polarity of charging diode 164 such that terminal 171 of the auxiliary storage capacitor 166 is charged to a negative 3 volt no-load battery voltage. LED 161 and blocking diode 170 are also connected suitably in reversed polarity from that of FIG. 2.

In operation, when trigger switch 146 is closed to initiate flash illumination, and assuming that data bit selector switch 172 is closed to generate a recorded fat bit, terminal 156 is pulled positive to the voltage level on common line 26a restarting the flash charger circuit 130 in the manner similar to that described above for FIG. 2. Because the loaded output voltage of battery 125 is about 1.5 volts, auxiliary storage capacitor 166, which was previously charged to a negative potential at 171 of negative 3.0 volts, discharges through the second circuit path of LED 61, resistor 168 and blocking diode 170 to the momentary positive potential on terminal 156 thereby illuminating LED 161.

The invention has been described in detail with particular reference to certain preferred embodiments thereof, but it will be understood that variations and modifications can be effected within the spirit and scope of the invention.

What is claimed is:

1. An optical data recording circuit having an optical recording device having first and second terminals for exposing data marks on film in a camera, the camera including a flash charging circuit, a flash illumination circuit having a main flash capacitor, and battery means having first and second output terminals operatively coupled to the flash charging circuit, the data recording circuit characterized by:

a first circuit path including a charging diode and an auxiliary storage capacitor coupled between said first and second output terminals of the battery means to charge said auxiliary storage capacitor to a no-load output voltage of said battery means, said first terminal of said optical recording device being coupled to said auxiliary storage capacitor; and a second circuit path including a switch device adapted for closure in conjunction with initiation of a flash illumination, the second circuit path being coupled from the second terminal of the optical recording device to one of said battery means terminals and effective upon closure of the switch device for coupling the second terminal of the recording device to a terminal of the battery means;

whereby charge voltage on said auxiliary capacitor is normally maintained at a level substantially corresponding to no-load output voltage of the battery means and, when said switch device is closed upon initiation of flash illumination, if an operating load on the battery means renders output voltage of the battery means insufficient to effect illumination of said optical recording device, then said auxiliary capacitor charge voltage effects illumination of said optical recording device.

2. The circuit of claim 1 wherein said first circuit path includes a terminal intermediate said charging diode and said auxiliary storage capacitor and said first terminal of the optical recording device is connected to said intermediate terminal whereby, under a no-load condition on said battery means, said optical recording device is illuminated by said battery means through said charging diode.

3. The circuit of claim 1 wherein said data recording circuit includes a pair of optical data recording devices and a selector switch for selecting between one or both of said recording devices for illumination by said auxiliary storage capacitor.

4. The circuit of claim 1 wherein said switch device comprises a flash trigger switch used to initiate flash illumination in said flash illumination circuit and said second circuit path includes a blocking diode to isolate the optical recording device from high voltages on said main flash capacitor.

5. The circuit of claim 1 wherein said flash illumination circuit includes a flash trigger switch used to initiate flash illumination in said flash illumination circuit and said switch device is a separate switch adapted for closure at the same time as said flash trigger switch.

6. The circuit of claim 5 wherein said switch device is mechanically coupled to said flash trigger switch for closure at the same time as said flash trigger switch.

7. The circuit of claim 1 wherein said switch device has a normally open terminal and a second terminal, said battery means first terminal is an output voltage terminal DC coupled to both said flash charging circuit and to the normally open terminal of said switch device and said battery means second terminal is DC connected to a return line common to said flash charging circuit and said second terminal of the switch device.

8. The circuit of claim 7 wherein said switch device is a flash trigger switch in the flash illumination circuit.

9. The circuit of claim 1 wherein said flash charging circuit has a common return line connected to one of said terminals of the battery means and the flash illumination circuit has a separate common return line connected to the other of said terminals of the battery means; the switch device has a normally open terminal connected to said second circuit path and a second terminal connected to said other terminal of the battery means via said separate common return line.

* * * * *